(12) United States Patent
Buckley et al.

(10) Patent No.: US 10,536,608 B1
(45) Date of Patent: Jan. 14, 2020

(54) DITHERING IN SRGB SPACE

(71) Applicant: Oculus VR, LLC, Menlo Park, CA (US)

(72) Inventors: Edward Buckley, Melrose, MA (US); Larry Seiler, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/051,313

(22) Filed: Jul. 31, 2018

(51) Int. Cl.
G09G 5/02 (2006.01)
G09G 5/10 (2006.01)
G09G 3/20 (2006.01)
H04N 19/12 (2014.01)
H04N 1/405 (2006.01)
H04N 1/40 (2006.01)
H04N 1/60 (2006.01)

(52) U.S. Cl.
CPC ....... H04N 1/4057 (2013.01); H04N 1/40012 (2013.01); H04N 1/40081 (2013.01); H04N 1/40087 (2013.01); H04N 1/6008 (2013.01)

(58) Field of Classification Search
CPC combination set(s) only.
See application file for complete search history.

(56) References Cited

U.S. PATENT DOCUMENTS

2016/0118020 A1* 4/2016 Buckley ............... G09G 3/2022
                                                          345/597
2017/0278447 A1* 9/2017 Yaras ................... G09G 3/2055

* cited by examiner

Primary Examiner — Wesner Sajous
(74) Attorney, Agent, or Firm — FisherBroyles, LLP

(57) ABSTRACT

The disclosed computer-implemented method for performing dithering in non-linear space may include receiving, as an input, a non-linear sRGB-encoded data stream that includes pixel data that is to be displayed on a display screen. The disclosed method may next include generating a dithering mask for the non-linear sRGB-encoded data stream. Still further, the method may include dithering the non-linear sRGB-encoded data stream using the generated dithering mask according to a scalar dithering algorithm or a vector dithering algorithm. The method may also include linearizing the dithered non-linear sRGB-encoded data stream for display on the display screen, and may include providing the linearized RGB-encoded data stream to the display screen for display. Various other methods, systems, and computer-readable media are also disclosed.

20 Claims, 8 Drawing Sheets

DITHERING IN SRGB SPACE

BACKGROUND

Current electronic displays provide crisp, highly detailed images. Whether these displays are on televisions, computer monitors, tablets or phones, the displays can project images that are highly accurate to real life. One downside to such displays is the correspondingly large amount of data needed to drive the displays. Most high-resolution display screens are made of thousands or millions of individual pixels, each of which is illuminated according to display data that includes an intensity value and/or color value for each pixel.

One way to reduce the amount of data needed to drive the display is to dither the display data. Dithering is a process that gives a display the ability to display greyscale or color values that it doesn't have, while at the same time reducing the number of bits that need to be transferred to the screen. In traditional implementations, dithering is a strictly linear operation that takes a spatially linear average of the object that is to be represented in the image. Once the dithering has been performed, the data can be converted to non-linear sRGB (standard red, green and blue) to reduce bandwidth. This conversion from linear RGB (red, green, blue) to non-linear sRGB and then back again to linear for the electronic display costs multiple operations per pixel per frame. As such, the conventional dithering process, including receiving sRGB data, linearizing it, dithering it, processing it, transmitting it in sRGB (to save bandwidth), and then converting it back to linear data for the display screen, is computationally expensive and burdensome.

SUMMARY

As will be described in greater detail below, the instant disclosure describes methods and systems for dithering in non-linear space. While traditional systems convert pixel data to linear RGB data prior to dithering, the embodiments herein provide a way to perform dithering on non-linear, sRGB-encoded pixel data. In this manner, the systems herein may receive sRGB-encoded input data, dither, and output sRGB data, while only converting to linear data at the end of the process, right before sending the data to the display screen.

In one example, a computer-implemented method for performing dithering in non-linear space may include receiving, as an input, a non-linear sRGB-encoded data stream that includes pixel data that is to be displayed on a display screen. The computer-implemented method may next include generating a dithering mask for the non-linear sRGB-encoded data stream or for a linear-encoded data stream. Still further, the computer-implemented method may include dithering the non-linear sRGB-encoded data stream using the generated dithering mask according to a scalar dithering algorithm or a vector dithering algorithm. The computer-implemented method may also include linearizing the dithered non-linear sRGB-encoded data stream for display on the display screen, and then providing the linearized RGB-encoded data stream to the display screen for display.

In some examples, generating the dithering mask for the non-linear sRGB-encoded data stream may include creating noise patterns and comparing pixel values in the non-linear sRGB-encoded data stream to noise values in the noise patterns. This comparison may result in a dither value for each pixel.

In some examples, generating the dithering mask for the non-linear sRGB-encoded data stream may include implementing a mask pattern with a specified density. For example, to make an area have a density of 0.5 (i.e., half black/half white), a mask pattern with an average density of 0.5 may be implemented. The dithering mask may then be generated by summing the mask patterns.

In some examples, dithering the non-linear sRGB-encoded data stream using the generated dithering mask may be performed using a scalar dithering algorithm. In such cases, input values for the dither mask may be provided so that a specified input value results in an expected optical density. In some examples, the expected optical density may be 0.5 or 50%. In such cases, different values may be identified for non-linear sRGB-encoded data to reach the expected optical density of 0.5.

In some examples, dithering the non-linear sRGB-encoded data stream using the generated dithering mask may be performed using a vector dithering algorithm. In such cases, a generated dithering mask may be used to identify a color's position in a unit cube. The identified position of the color may define a tetrahedral which, in turn, defines a dither pattern. This dither pattern may then be used to dither the pixel data.

In some examples, dithering the non-linear sRGB-encoded data stream using the generated dithering mask may include the following: linearizing the non-linear sRGB-encoded data stream into a linear RGB-encoded data stream using a piecewise linearizing function. The dithering may also include determining, for each pixel, which tetrahedral encloses the pixel and dithering the linear RGB-encoded data steam using a generated dithering mask. The process may then include non-linearly quantizing the linear RGB-encoded data stream into non-linear sRGB-encoded format, and scaling the dithered non-linear sRGB-encoded data steam according to a specified scaling factor.

In some examples, the piecewise linearizing function approximates linear segments. These linear segments may then be combined using a specified function. This combination of linear segments may result in the linear RGB-encoded data stream.

In some examples, dithering the non-linear sRGB-encoded data stream using the generated dithering mask may include the following: linearizing the non-linear sRGB-encoded data stream into a linear RGB-encoded data stream using a piecewise linearizing function, and determining, for each pixel, which tetrahedral encloses the pixel. The process may then include dithering the linear RGB-encoded data steam using the generated dithering mask, linearly quantizing the linear RGB-encoded data stream into non-linear sRGB-encoded format using a lookup table, and scaling the dithered non-linear sRGB-encoded data steam according to a specified scaling factor. This linear quantizing may be performed in hardware such as a programmable microprocessor or similar device. In some examples, the linear RGB-encoded data stream may be linearly quantized into non-linear sRGB-encoded format using a one-dimensional lookup table.

In addition, a corresponding system for performing dithering in non-linear space may include a display screen and several modules stored in memory, including a receiving module that receives, as an input, a non-linear sRGB-encoded data stream that includes pixel data that is to be displayed on the display screen. The system may also include a mask generating module that generates a dithering mask for the non-linear sRGB-encoded data stream or for a linear-encoded data stream. The system may further include a dithering module that dithers the non-linear sRGB-encoded data stream using the generated dithering mask according to a scalar dithering algorithm or a vector dithering algorithm. The system may also include a linearizing module that linearizes the dithered non-linear sRGB-encoded data stream for display on the display screen, as well as a data transmission module that sends the linearized RGB-encoded data stream to the display screen for presentation to a user.

In some examples, dithering the non-linear sRGB-encoded data stream using the generated dithering mask may include linearizing the non-linear sRGB-encoded data stream into a linear RGB-encoded data stream using a piecewise linearizing function, determining, for each pixel, which tetrahedral encloses the pixel, dithering the linear RGB-encoded data steam using the generated dithering mask, non-linearly quantizing the linear RGB-encoded data stream into non-linear sRGB-encoded format, and scaling the dithered non-linear sRGB-encoded data steam according to a specified scaling factor.

In some examples, non-linearly quantizing provides non-linear sRGB-encoded pixel values along a specified sRGB curve. Using such a non-linear sRGB-encoded pixel value may reduce bit depth for the linearized RGB-encoded data stream without reducing image quality.

In some examples, dithering non-linear sRGB-encoded data may add two mathematical operations over dithering linear RGB-encoded data. In some examples, dithering the non-linear sRGB-encoded data stream using the generated dithering mask may include linearizing the non-linear sRGB-encoded data stream into a linear RGB-encoded data stream, where the linearizing is performed using a piecewise linearizing function, determining, for each pixel, which tetrahedral encloses the pixel, dithering the linear RGB-encoded data steam using the generated dithering mask, linearly quantizing the linear RGB-encoded data stream into non-linear sRGB-encoded format using a lookup table, and scaling the dithered non-linear sRGB-encoded data steam according to a specified scaling factor.

In some examples, the piecewise linearizing function approximates linear segments which are combined using a specified function. This combination of linear segments may result in the linear RGB-encoded data stream. Generating the dithering mask for the non-linear sRGB-encoded data stream may include creating noise patterns and comparing pixel values in the non-linear sRGB-encoded data stream to noise values in the noise patterns. This comparison may result in a dither value for each pixel. In some examples, generating the dithering mask for the non-linear sRGB-encoded data stream may include implementing a mask pattern with a specified density.

In some examples, the above-described method may be encoded as computer-readable instructions on a computer-readable medium. For example, a computer-readable medium may include one or more computer-executable instructions that, when executed by at least one processor of a computing device, may cause the computing device to receive, as an input, a non-linear sRGB-encoded data stream that includes pixel data that is to be displayed on a display screen, generate a dithering mask for the non-linear sRGB-encoded data stream or for a linear-encoded data stream, dither the non-linear sRGB-encoded data stream using the generated dithering mask according to at least one of a scalar dithering algorithm or a vector dithering algorithm, linearize the dithered non-linear sRGB-encoded data stream for display on the display screen, and provide the linearized RGB-encoded data stream to the display screen for display.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
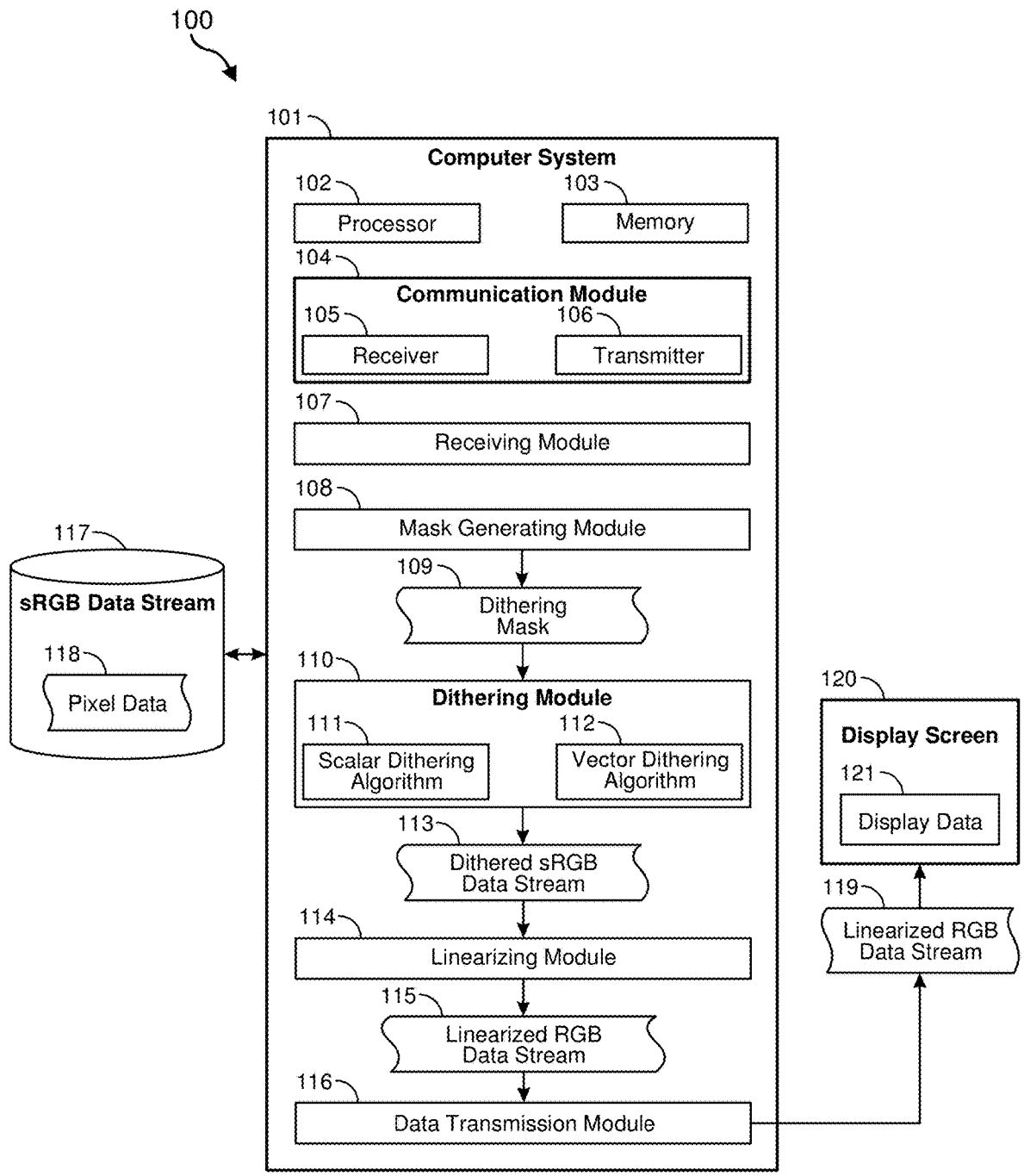
FIG. 1 illustrates a computer architecture in which embodiments herein may operate including dithering in sRGB space.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems, methods and computer program products for dithering in the sRGB space. As noted above, dithering is a typically a linear operation performed on linearized pixel data (i.e. red, green, blue (RGB)-encoded pixel data). As will be explained in greater detail below, embodiments of the present disclosure may provide methods and systems for performing dithering on a stream of non-linear sRGB-encoded pixel data. By performing the dithering in non-linear, sRGB space, data transfer bandwidth is reduced (i.e. bit depth is reduced) without sacrificing image quality. Reducing the data transfer bandwidth also reduces power consumption which is beneficial on mobile devices or other battery-powered devices.

The following will provide, with reference to FIGS. 1-8, a detailed description of how dithering is to be performed in the sRGB space. FIG. 1, for example, illustrates a computing architecture 100 in which many of the embodiments described herein may operate. The computing architecture 100 may include a computer system 101. The computer system 101 may include at least one processor 102 and at least some system memory 103. The computer system 101 may be any type of local or distributed computer system, including a cloud computer system. The computer system 101 may include program modules for performing a variety of different functions. The program modules may be hardware-based, software-based, or may include a combination of hardware and software. Each program module may use or represent computing hardware and/or software to perform specified functions, including those described herein below.

For example, communications module 104 may be configured to communicate with other computer systems. The communications module 104 may include any wired or wireless communication means that can receive and/or transmit data to or from other computer systems. These communication means may include radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded systems, or other types of computing systems.

The computer system 101 may also include a receiving module 107 that may receive or otherwise access an sRGB data stream 117. The sRGB data stream 117 may include pixel data 118. This pixel data 118 may be used to drive the display screen 120. At least in some embodiments, the display screen 120 is a light emitting diode (LED), organic LED, or other type of display that has a plurality of individual pixels. Each of these pixels may be controlled individually, such that each pixel's color and intensity values may change to project an image. Linear RGB pixel data is used to drive such displays. In some cases, these pixel color and intensity values may be updated at a specified frequency. For example, display screens may refresh at 30 Hz, 60 Hz, 120 Hz, 240 Hz or at some other rate. In such cases, the pixels' color and/or intensity values may be updated 30, 60, 120 or 240 times per second. Other refresh rates are also possible. Moreover, it will be understood that not every pixel needs to be updated every frame. For instance, if display screen 120 is showing a movie, parts of the screen may be unchanging (e.g., the background of a dialog scene). In such cases, the pixel may maintain its color and/or intensity value for longer than the refresh rate.

Although the sRGB data stream 117 may be referred to as a "stream" or "data stream" herein, it will be recognized that the methods and embodiments described below may operate with a single pixel, a group of pixels, a single data packet, or a group of data packets. Still further, these data packets do not need to be transmitted as a continuous stream of data. Rather, the sRGB data stream 117 may refer to any type of sRGB pixel data transmitted in any form at any data rate. In some cases, the sRGB data stream 117 may be accessed from a local data store, or from a remote data store (e.g. over a wireless connection), or from a camera or other device generating the sRGB data.

A mask generating module 108 may be used to generate a dithering mask 109. The dithering mask 109 may be used to perform dithering on the sRGB data stream 117. As used herein, the term "dithering" may refer to a computer graphics processing method that provides a display the ability to display greyscale values (or colors) that the display does not inherently have. For example, if a display can only show black and white, or is only capable of displaying a certain number of colors at a time (e.g. 256 colors), a dithering mask may be applied to an image to generate intermediate greyscale or color values by forming an intermediate, approximated value. This approximated value may then be somewhere between black and white, or somewhere between two (or more) of the 256 available colors. Dithering takes advantage of human eye's ability to mix two colors in close proximity to one another. As such, dithering allows displays to more accurately display graphics containing a greater range of colors than the display hardware is capable of showing. The dithering mask 109, as will be explained further below, may be used by the dithering module 110 to perform scalar dithering and/or vector dithering using scalar dithering algorithm 111 or vector dithering algorithm 112.

Once the sRGB data stream 117 has been dithered by the dithering module 110, the dithered sRGB data stream 113 may be passed to a linearizing module 114. The linearizing module 114 linearizes the sRGB data for display on the display screen 120. The resulting linearized RGB data stream 115 is passed by the data transmission module 116 to the display screen 120 where it is displayed as display data 121. These concepts will be explained further below with regard to method 200 of FIG. 2 and the embodiments shown in FIGS. 3-7.

Figure 2:
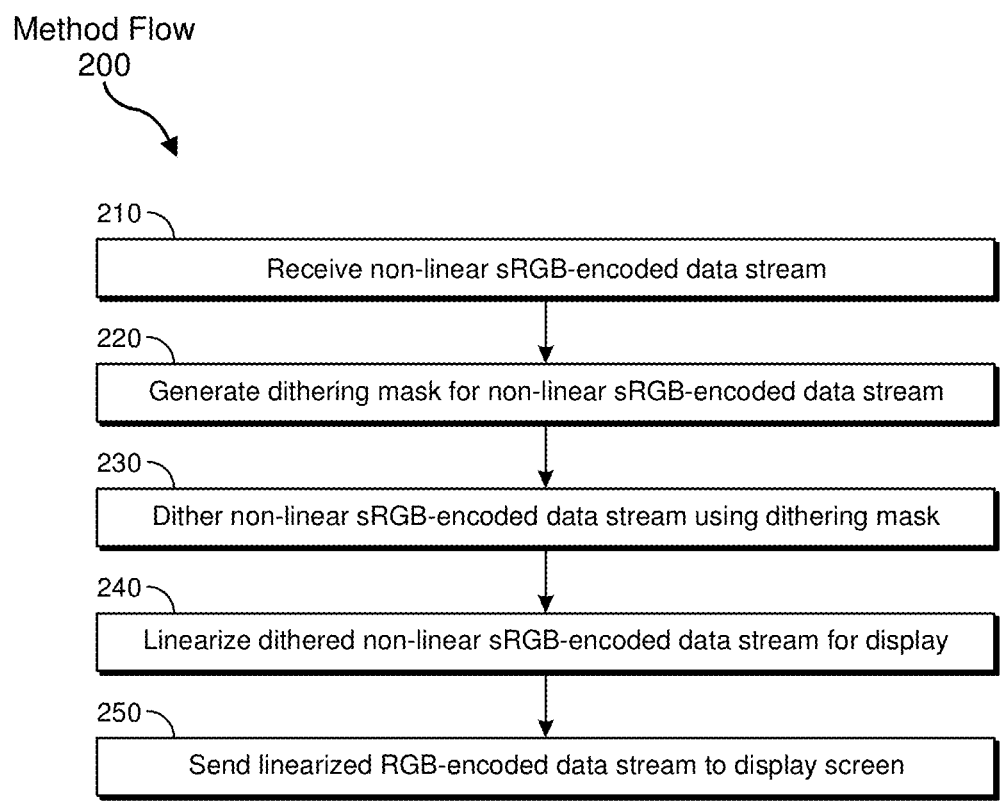
FIG. 2 illustrates a flow diagram of an exemplary method for dithering in sRGB space.

FIG. 2 is a flow diagram of an exemplary computer-implemented method 200 for dithering in non-linear sRGB space. The steps shown in FIG. 2 may be performed by any suitable computer-executable code and/or computing system, including the system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein may receive, as an input, a non-linear sRGB-encoded data stream that includes pixel data that is to be displayed on a display screen. For example, receiving module 107 may receive, as an input, a non-linear sRGB-encoded data stream 117 that includes pixel data 118 that is to be displayed on a display screen 120. The sRGB data stream 117 may include pixel data 118 for a single pixel, or for many hundreds, thousands or millions of pixels (or more). The pixel data 118 may be configured to drive each pixel of the display screen 120. The pixels may be updated in a continuous or continual fashion, as new pixel data 118 is received in the sRGB data stream 117.

Method 200 may next include generating a dithering mask for the non-linear sRGB-encoded data stream or for a linear-encoded data stream (220). The mask generating module 108 may generate a dithering mask 109 in different ways. For example, in some cases, generating the dithering mask 109 for the non-linear sRGB-encoded data stream 117 (or for a linear-encoded RGB data stream) may include creating noise patterns and comparing pixel values. For example, noise patterns and pixel values in the non-linear sRGB-encoded data stream 117 may be compared to noise values in the noise patterns. This comparison may then result in a dither value for each pixel. At least in some embodiments, multiple patterns may be summed together that have the density of the greyscale value that is ultimately desired.

Figure 3:
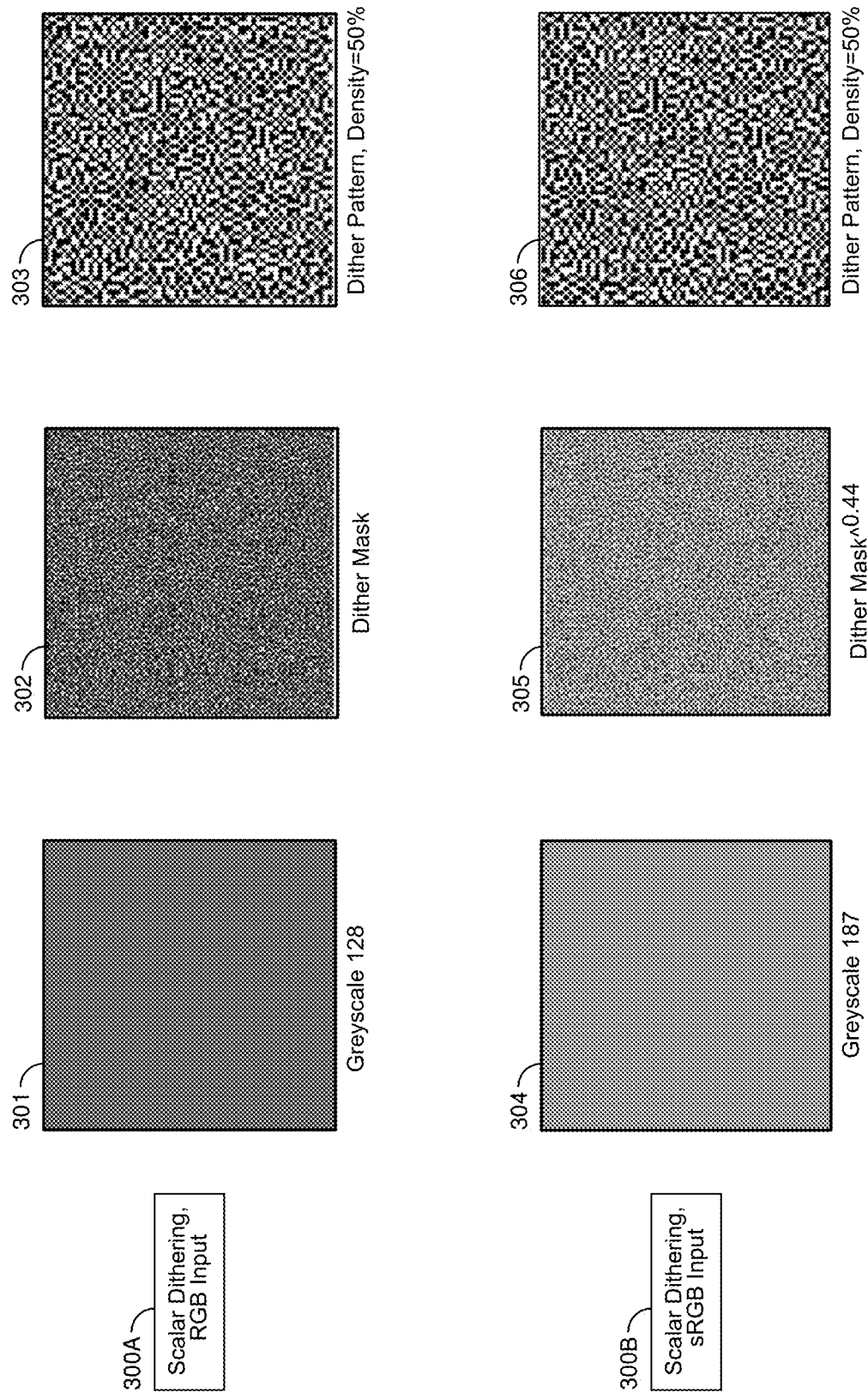
FIG. 3 illustrates an embodiment in which dither patterns are generated for use in scalar dithering.

For instance, as shown in FIG. 3, generating a dithering mask 305 for a non-linear sRGB-encoded data stream (at step 230 of FIG. 2) may include implementing a mask pattern with a specified density. For instance, to make an area in an image have an optical density of 0.5 (e.g., half black/half white), a mask pattern with a density of 0.5 (or 50%) may be generated, and the mask may be made by summing the patterns. In the linear scalar dithering process 300A shown in FIG. 3, a greyscale value of 128 is used at 301 to generate the dither mask 302. This dither mask 302 is then applied to create a dither pattern 303 which has a density of 50%. If a different dither pattern density is desired (e.g. 25% or 75%), the initial value of the greyscale may be reduced or increased, respectively.

Similarly, in the scalar dithering process for non-linear sRGB data 300B, an input value of 187 is provided at 304 for the dither mask 305. This input value may be selected such that a specified input value results in an expected optical density. In this example, the expected optical density is again 50%. Because the inputs are non-linear, the 50% half-power point is at a different level because the of the way the pixel values are encoded. The input value of the dither mask is thus changed to a power law function to dither to an optical density of 50%. In 305 of FIG. 3, the dither mask implements a power law function, being raised to the power of 0.44. Thus, relative to the linear RGB input of 300A, a higher greyscale input value (187) is used at 304 to ensure that the resulting dither pattern 306 has a density of 50%. Accordingly, when scalar dithering a non-linear sRGB input, changing the input values of the dither mask may be sufficient to achieve a desired optical density.

Figure 4:
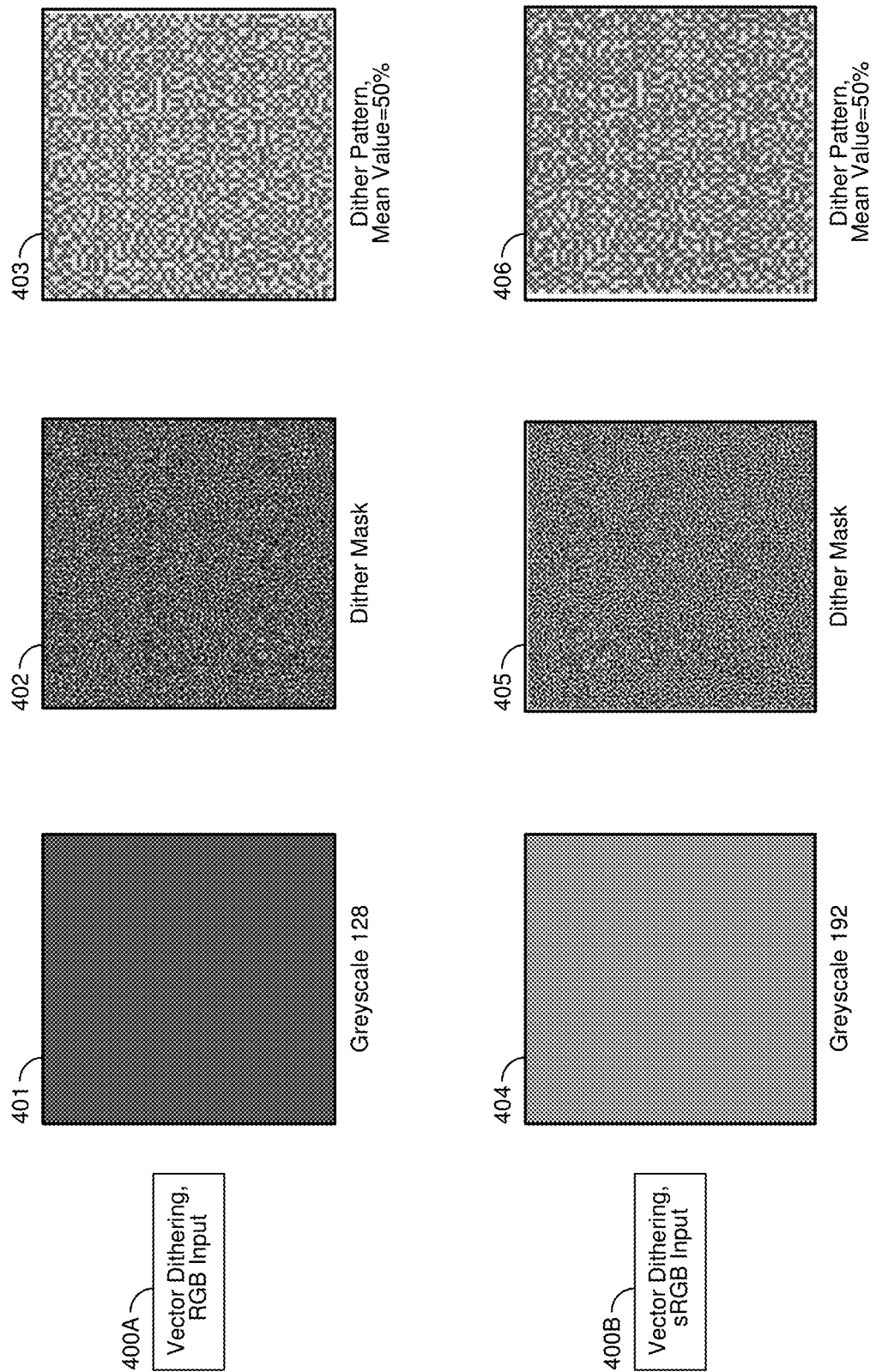
FIG. 4 illustrates an embodiment in which dither patterns are generated for use in vector dithering.

As shown in FIG. 4, the process of dithering using a vector dithering algorithm may be performed on linear RGB-encoded data, or on non-linear sRGB-encoded data. In 400A, a greyscale value of 128 is selected (401). This greyscale value is used to generate the dither mask 402, which in turn is used to generate the dither pattern 403. This dither pattern 403 has a mean value of 50%. As with scalar dithering, vector dithering for a non-linear sRGB input uses a different greyscale value. As can be seen in 400B of FIG. 4, a greyscale value of 192 is selected at 404 and used to generate the dither mask 405. This dither mask is then used to create the dither pattern 406 with a mean value of 50%. Because vector dithering involves both color values and intensity values (as opposed to scalar dithering which only involves intensity values), additional steps may be involved beyond simply selecting a different input value.

Figure 5:
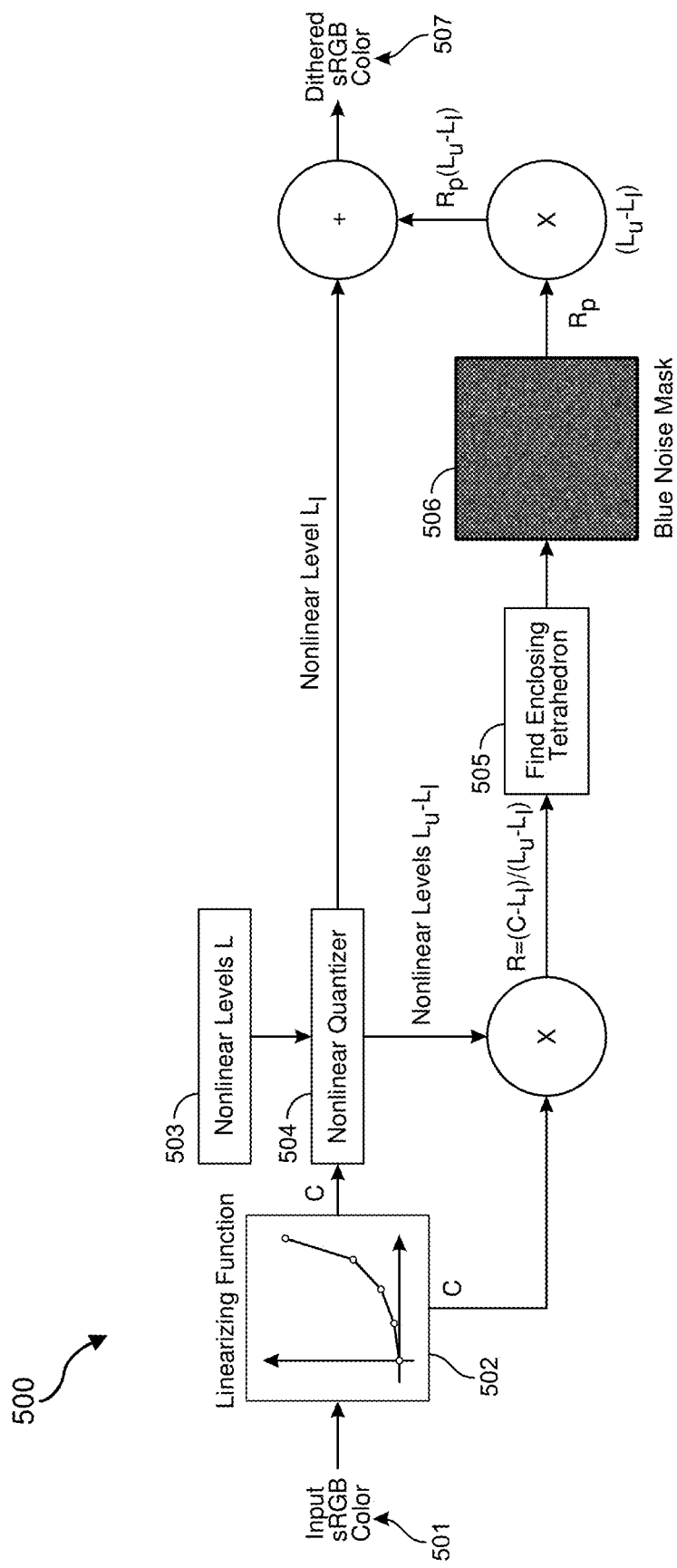
FIG. 5 illustrates a flow diagram in which non-linear quantization is implemented in the dithering process.

For example, as shown in the flow diagram 500 of FIG. 5, an sRGB input 501 is provided which is then linearized using a linearizing function 502. Vector dithering implements a linear color space and, as such, the sRGB color input 501 may be linearized using linearizing function 502. Traditionally, this linearization is performed using a 3D lookup table. In at least some embodiments herein, a piecewise approximation is used to simulate sRGB values. As noted earlier, the sRGB color values are non-linear, and may be approximated by one or more linear segments. These linear segments may be combined using an addition operation and a multiplication operation in the piecewise conversion to linear space. This may avoid having to use a lookup table to perform the linearization. Accordingly, the sRGB data 501 comes in to the system and is decoded to linear space using a piecewise approximation.

In one embodiment, the piecewise approximation may involve the following linear piecewise function. This function may provide 10-bit linear values from 8-bit sRGB using four segments:

$$G' = \begin{cases} G & 0 \le G < 64 \\ 2(G-63)+64 & 64 \le G < 128 \\ 5(G-127)+192 & 128 \le G < 192 \\ 8(G-191)+512 & 192 \le G \le 255 \end{cases}$$

Using this (or a similar) algorithm may minimize the incremental per-pixel hardware cost of using sRGB input values.

In the above example, the per-pixel cost is only increased by a single addition operation and a single multiply operation, while the overall savings in bandwidth from performing the dithering in the sRGB space may be two or more bits per pixel per color. Thus, the bandwidth saved may be two bits for red, two bits for green and two bits for blue, per pixel, or 6 bits total per pixel. Six bits per pixel adds up quickly on an image with many thousands or millions of pixels.

Dithering the non-linear sRGB-encoded data stream using a dithering mask may thus be performed using a vector dithering algorithm. In such cases, the dithering mask may be generated using a linear-encoded data stream. Implementing a vector dithering algorithm may also involve non-linearly quantizing the linear RGB-encoded data stream into a non-linear sRGB-encoded format. As shown in FIG. 5, non-linear quantizer 504 may be used to quantize the linear RGB-encoded data into a non-linear sRGB format using non-linear level L (503) as an input. The previously generated dithering mask may then be used to identify which unit cube encloses the pixel (505). In the vector dithering process, each color's position is identified within a unit cube. The color's position in the unit cube defines a tetrahedral which, in turn, defines a dither pattern. An appropriate blue noise mask 506 may then be applied, resulting in a dithered sRGB color 507. In some embodiments, the dithered sRGB-encoded color 507 may also be scaled according to a specified scaling factor. Although non-linear quantizing is described in this embodiment, it will be recognized that linear quantizing may be performed instead (as shown in FIG. 6), and may use a lookup table to map to non-linear space.

Figure 6:
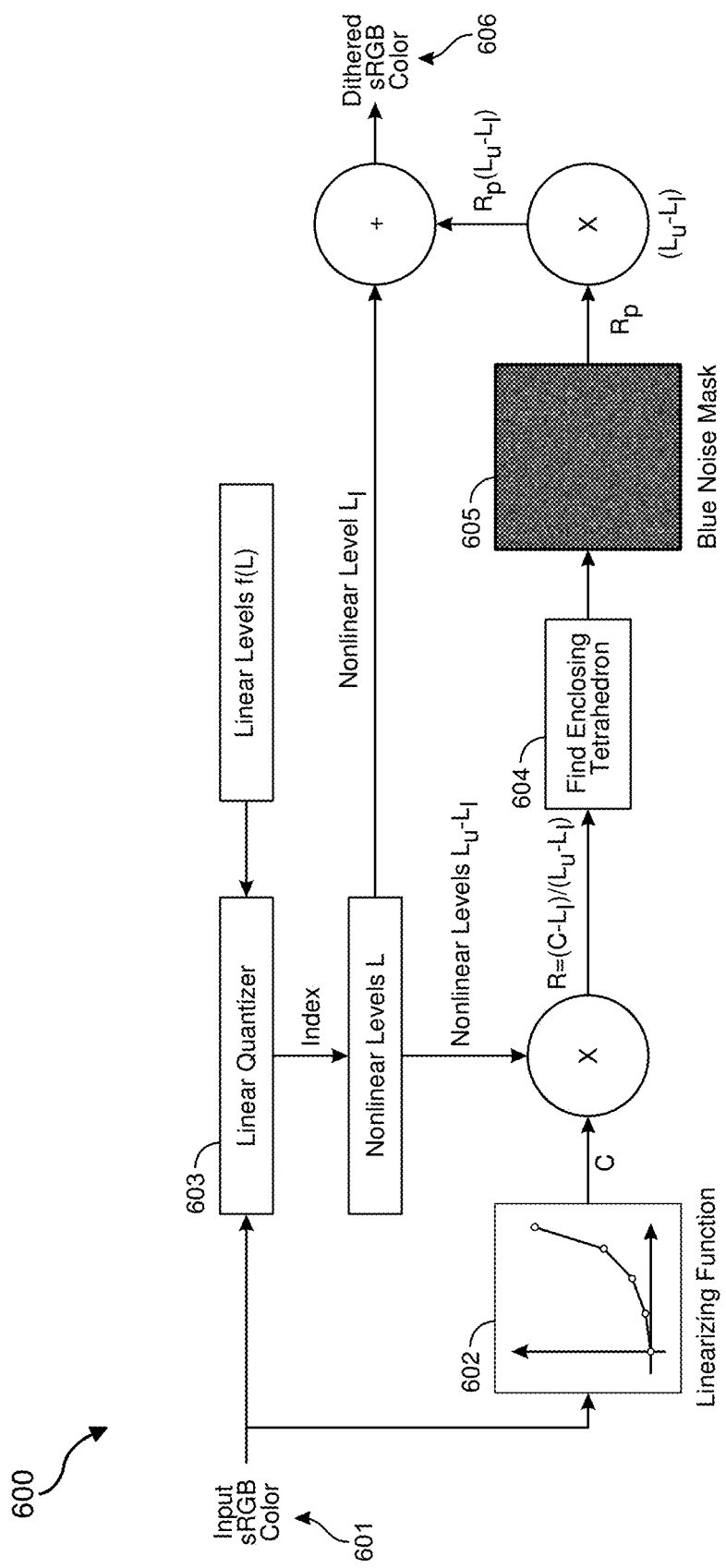
FIG. 6 illustrates a flow diagram in which linear quantization is implemented in the dithering process.

Dithering the non-linear sRGB-encoded data stream may also be performed using a linear quantizer, as shown the flow diagram 600 of FIG. 6. In FIG. 6, an sRGB-encoded data stream 601 may be received as input, and may be linearized into a linear RGB-encoded data stream 602. The linearizing may be performed using a piecewise linearizing function similar to or the same as that described above. The piecewise linearizing function approximates one or more linear segments that are combined using a specified function. The combination of linear segments results in the linear RGB-encoded data stream. The linear quantizer 603 may linearly quantize the linear RGB-encoded data stream into non-linear sRGB-encoded format using a lookup table. Then, step 604 determines, for each pixel, which tetrahedral encloses the pixel, dithers the non-linear sRGB-encoded data steam using a dithering mask 605, and scales the dithered non-linear sRGB-encoded data steam 606 according to a specified scaling factor. In some cases, linearly quantizing the linear RGB-encoded data stream into non-linear sRGB-encoded format using a lookup table may be performed on a programmable hardware microprocessor.

Thus, to summarize the process up to this point, the receiving module 107 of FIG. 1 may receive an sRGB input data stream 117 (step 210 of FIG. 2), the mask generating module 108 may generate a dithering mask 109 (step 220), and the dithering module 110 may perform dithering using either scalar dithering 111 or vector dithering 112 (step 230), resulting in a dithered sRGB data stream 113. At this point, in order for the dithered sRGB-encoded data (e.g., 507 of FIG. 5 or 606 of FIG. 6) to be displayed on the display screen (120), the linearizing module 114 may linearize the dithered non-linear sRGB-encoded data for display on the display screen 120 (step 240) and provide the linearized data to the display screen (step 250).

Figure 7:
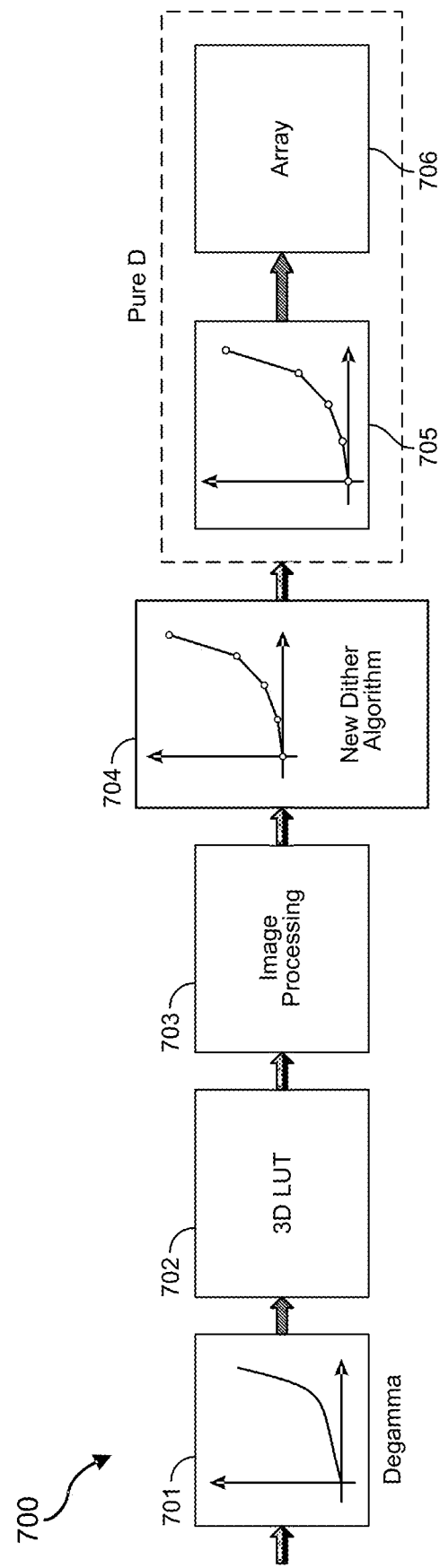
FIG. 7 illustrates a flow diagram in which dithering is performed on non-linear sRGB-encoded pixel data.

Most types of displays include arrays of pixels that are driven by linearized pixel data. Accordingly, the data transmission module 116 transmits or otherwise passes the linearized RGB-encoded data stream 115 to the display screen 120 for display as display data 121. This linearization step is shown in FIG. 7 where, at 705, the sRGB data from the dithering algorithm 704 is linearized and sent to the display array 706. In some embodiment, however, displays may be provided which natively accept non-linear sRGB data. As such, in those cases, the linearization step at 705 may be omitted, and the array 706 may simply display the dithered sRGB data provided at 704.

Indeed, FIG. 7 illustrates one embodiment in which pixel data is processed according to a processing flow 700. The process may begin with a degamma operation at 701 upon receiving non-linear sRGB input data (as indicated by the dotted input arrow). This degamma operation is performed in linear space, and as such, the output is linear RGB data (as indicated by the lined arrow). After the degamma operation is performed, the pixel data may be transformed to another linear space using a three-dimensional lookup table (3D LUT 702). Image processing is performed at 703, and the scalar (111) or vector (112) dithering algorithms (described above in FIGS. 3-4) are applied at 704. At least in some embodiments, the image processing performed at 703 converts the data to sRGB-encoded data. The dithering algorithms applied at step 704 may include non-linear quantization, as described in FIG. 5, or linear quantization as described in FIG. 6.

Once the quantization has been performed and the pixel data has been dithered, the pixel data may be linearized at 705 and displayed on array 706. The embodiments herein thus take sRGB-encoded pixels as input data, process the data in non-linear space, and output non-linear sRGB-encoded pixels up until the point immediately before display, at which the pixels are linearized and sent to the screen. Non-linear sRGB inputs can be used to vector dither and achieve the same results as would have been achieved with a linearized dither. The bandwidth saved on the display link by using non-linear sRGB space may be substantial, while the operational cost of working with sRGB data is only one additional multiply operation and one additional addition operation per pixel. Accordingly, bandwidth (i.e., bit depth) may be reduced without losing image quality. Reducing bandwidth also reduces power consumption, which is beneficial for mobile and other battery-powered devices.

In some embodiments, systems and computer-readable media are provided which are configured to implement the methods described above. For example, a computer-readable medium may be provided which includes computer-readable instructions that, when executed by at least one processor of a computing device, cause the computing device to: receive, as an input, a non-linear sRGB-encoded data stream (e.g. 117 of FIG. 1) that includes pixel data 118 that is to be displayed on a display screen 120. The computer-readable instructions further cause the computing device to generate a dithering mask 109 for the non-linear sRGB-encoded data stream. This dithering mask 109 may then be used to dither the non-linear sRGB-encoded data stream 117 according to a scalar dithering algorithm 111 or a vector dithering algorithm 112. Once dithering has been performed, computer-readable instructions may cause the computing device to linearize the dithered non-linear sRGB-encoded data stream for display on the display screen 120, and provide the linearized RGB-encoded data stream 115 to the display screen for display.

Additionally or alternatively, a system may be provided for dithering in non-linear space. The system may include a display screen 120, a receiving module 107 that receives, as an input, a non-linear sRGB-encoded data stream 117 that includes pixel data 118 that is to be displayed on the display screen, a mask generating module 1098 that generates a dithering mask 109 for the non-linear sRGB-encoded data stream, a dithering module 110 that dithers the non-linear sRGB-encoded data stream 117 using the generated dithering mask 109 according to at a scalar dithering algorithm 111 or a vector dithering algorithm 112, a linearizing module 114 that linearizes the dithered non-linear sRGB-encoded data stream 117 for display on the display screen 120, and a data transmission module 116 that sends the linearized RGB-encoded data stream 115 to the display screen for display.

Figure 8:
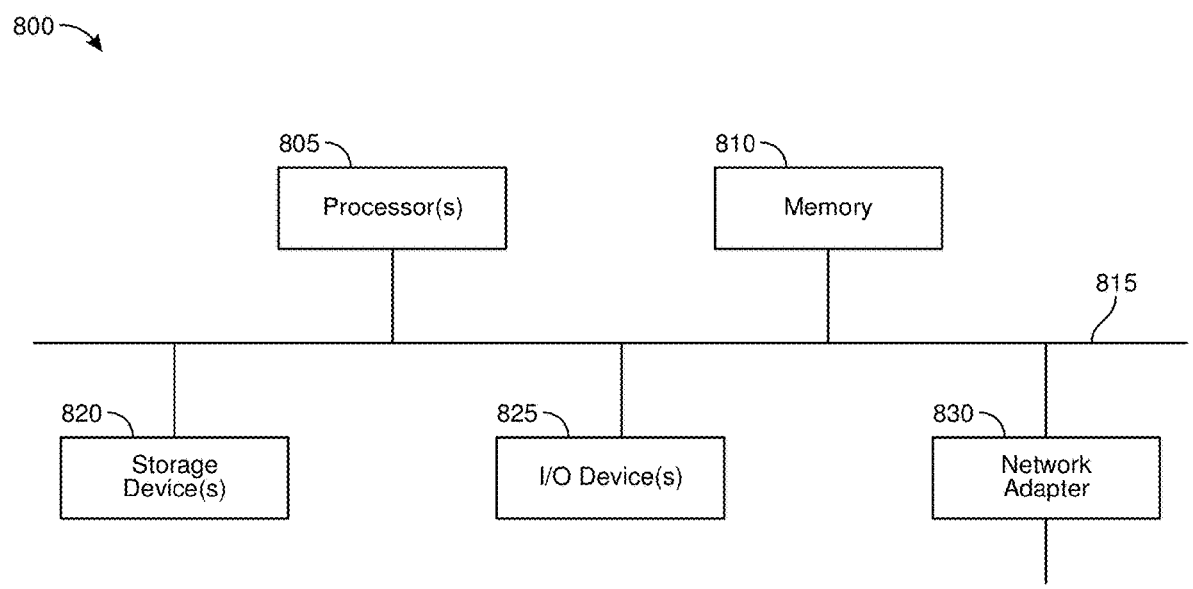
FIG. 8 illustrates an example computer system in the embodiments herein may operate including dithering in sRGB space.

FIG. 8 is a block diagram of a computer system that may be used to implement features of some of the embodiments, e.g., to implement the content provisioning module. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 810 and storage devices 820 may represent computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

Accordingly, the embodiments herein provide a means of dithering in non-linear sRGB space. By performing dithering (or other image processing operations) in sRGB space, as opposed to traditional, linear RGB space, the bandwidth needed to transfer each pixel to the display screen may be reduced without reducing image quality. In high-resolution display screens, a savings of even a single bit per pixel quickly amounts to thousands or millions of bits that no longer need to be transferred over the display link. This reduces power consumption, and reduces load on the display link. The dithering methods described herein may thus take a lower-bandwidth sRGB input and provide a lower-bandwidth sRGB output, while only adding minimal addition and multiplication steps easily handled by a processor or dedicated hardware.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of."Finally, for ease of use, the terms "including" and "having" (and their derivatives), as used in the specification and claims, are interchangeable with and have the same meaning as the word "comprising."

We claim:
1. A computer-implemented method comprising:
receiving, as an input, a non-linear sRGB-encoded data stream that includes pixel data that is to be displayed on a display screen;
generating a dithering mask for at least one of the non-linear sRGB-encoded data stream or a linear-encoded data stream;

dithering the non-linear sRGB-encoded data stream using the generated dithering mask according to at least one of a scalar dithering algorithm or a vector dithering algorithm;

linearizing the dithered non-linear sRGB-encoded data stream for display on the display screen; and providing the linearized RGB-encoded data stream to the display screen for display.

2. The computer-implemented method of claim 1, wherein generating the dithering mask for the non-linear sRGB-encoded data stream comprises creating one or more noise patterns and comparing pixel values in the non-linear sRGB-encoded data stream to one or more noise values in the noise patterns, the comparison resulting in a dither value for each pixel.

3. The computer-implemented method of claim 2, wherein generating the dithering mask for the non-linear sRGB-encoded data stream comprises implementing a mask pattern with a specified density.

4. The computer-implemented method of claim 1, wherein dithering the non-linear sRGB-encoded data stream using the generated dithering mask is performed using a scalar dithering algorithm, and wherein input values for the dither mask are provided such that a specified input value results in an expected optical density.

5. The computer-implemented method of claim 4, wherein the expected optical density comprises a specified value between 0 and 1, and wherein different values are identified for non-linear sRGB-encoded data to reach the specified optical density.

6. The computer-implemented method of claim 1, further comprising linearizing the non-linear sRGB-encoded data stream into a linear RGB-encoded data stream, the linearizing being performed using a piecewise linearizing function, wherein dithering the non-linear sRGB-encoded data stream using the generated dithering mask is performed using a vector dithering algorithm, wherein the dithering mask is generated using the linear-encoded data stream, and wherein the generated dithering mask is used to identify a color's position in a unit cube, the color position defining a tetrahedral which defines a dither pattern.

7. The computer-implemented method of claim 1, wherein dithering the non-linear sRGB-encoded data stream using the generated dithering mask includes the following:

linearizing the non-linear sRGB-encoded data stream into a linear RGB-encoded data stream, the linearizing being performed using a piecewise linearizing function;

determining, for each pixel, which tetrahedral encloses the pixel, the tetrahedral defining a dither pattern;

dithering the linear RGB-encoded data steam using the defined dither pattern;

non-linearly quantizing the linear RGB-encoded data stream into non-linear sRGB-encoded format; and scaling the dithered non-linear sRGB-encoded data steam according to a specified scaling factor.

8. The computer-implemented method of claim 7, wherein the piecewise linearizing function approximates one or more linear segments which are combined using a specified function, the combination of linear segments resulting in the linear RGB-encoded data stream.

9. The computer-implemented method of claim 1, wherein dithering the non-linear sRGB-encoded data stream using the generated dithering mask includes the following:

linearizing the non-linear sRGB-encoded data stream into a linear RGB-encoded data stream, the linearizing being performed using a piecewise linearizing function;

determining, for each pixel, which tetrahedral encloses the pixel, the tetrahedral defining a dither pattern;

dithering the non-linear sRGB-encoded data steam using the defined dither pattern;

linearly quantizing the linear RGB-encoded data stream into linear sRGB-encoded format using a lookup table; and scaling the dithered non-linear sRGB-encoded data steam according to a specified scaling factor.

10. The computer-implemented method of claim 1, wherein linearly quantizing the linear RGB-encoded data stream into non-linear sRGB-encoded format using a lookup table is performed on a programmable hardware microprocessor.

11. A system comprising:

a display screen;

a receiving module that receives, as an input, a non-linear sRGB-encoded data stream that includes pixel data that is to be displayed on the display screen;

a mask generating module that generates a dithering mask for at least one of the non-linear sRGB-encoded data stream or a linear-encoded data stream;

a dithering module that dithers the non-linear sRGB-encoded data stream using the generated dithering mask according to at least one of a scalar dithering algorithm or a vector dithering algorithm;

a linearizing module that linearizes the dithered non-linear sRGB-encoded data stream for display on the display screen; and a data transmission module that sends the linearized RGB-encoded data stream to the display screen for display.

12. The system of claim 11, wherein dithering the non-linear sRGB-encoded data stream using the generated dithering mask includes the following:

linearizing the non-linear sRGB-encoded data stream into a linear RGB-encoded data stream, the linearizing being performed using a piecewise linearizing function;

determining, for each pixel, which tetrahedral encloses the pixel, the tetrahedral defining a dither pattern;

dithering the linear RGB-encoded data steam using the defined dither pattern;

non-linearly quantizing the linear RGB-encoded data stream into non-linear sRGB-encoded format; and scaling the dithered non-linear sRGB-encoded data steam according to a specified scaling factor.

13. The system of claim 12, wherein non-linearly quantizing provides non-linear sRGB-encoded pixel values along a specified sRGB curve.

14. The system of claim 13, wherein bit depth for the linearized RGB-encoded data stream is reduced without reducing image quality.

15. The system of claim 13, wherein dithering the non-linear sRGB-encoded data stream adds two mathematical operations over dithering linear RGB-encoded data.

16. The system of claim 12, wherein dithering the non-linear sRGB-encoded data stream using the generated dithering mask includes the following:

linearizing the non-linear sRGB-encoded data stream into a linear RGB-encoded data stream, the linearizing being performed using a piecewise linearizing function;

determining, for each pixel, which tetrahedral encloses the pixel, the tetrahedral defining a dither pattern;

dithering the linear RGB-encoded data steam using the defined dither pattern;

linearly quantizing the linear RGB-encoded data stream into non-linear sRGB-encoded format using a lookup table; and scaling the dithered non-linear sRGB-encoded data steam according to a specified scaling factor.

17. The system of claim 16, wherein the piecewise linearizing function approximates one or more linear segments which are combined using a specified function, the combination of linear segments resulting in the linear RGB-encoded data stream.

18. The system of claim 12, wherein generating the dithering mask for the non-linear sRGB-encoded data stream comprises creating one or more noise patterns and comparing pixel values in the non-linear sRGB-encoded data stream to one or more noise values in the noise patterns, the comparison resulting in a dither value for each pixel.

19. The system of claim 18, wherein generating the dithering mask for the non-linear sRGB-encoded data stream comprises implementing a mask pattern with a specified density.

20. A computer-readable medium comprising:

computer-readable instructions that, when executed by at least one processor of a computing device, cause the computing device to:

receive, as an input, a non-linear sRGB-encoded data stream that includes pixel data that is to be displayed on a display screen;

generate a dithering mask for at least one of the non-linear sRGB-encoded data stream or a linear-encoded data stream;

dither the non-linear sRGB-encoded data stream using the generated dithering mask according to at least one of a scalar dithering algorithm or a vector dithering algorithm;

linearize the dithered non-linear sRGB-encoded data stream for display on the display screen; and send the linearized RGB-encoded data stream to the display screen for display.

* * * * *

UNITED STATES PATENT AND TRADEMARK OFFICE
CERTIFICATE OF CORRECTION

PATENT NO. : 10,536,608 B1
APPLICATION NO. : 16/051313
DATED : January 14, 2020
INVENTOR(S) : Edward Buckley et al.

It is certified that error appears in the above-identified patent and that said Letters Patent is hereby corrected as shown below:

In Column 13, Line 53, Claim 7, delete "steam" and insert -- stream --, therefor.

In Column 13, Line 58, Claim 7, delete "steam" and insert -- stream --, therefor.

In Column 14, Line 7, Claim 9, delete "steam" and insert -- stream --, therefor.

In Column 14, Line 12, Claim 9, delete "steam" and insert -- stream --, therefor.

In Column 14, Line 46, Claim 12, delete "steam" and insert -- stream --, therefor.

In Column 14, Line 50, Claim 12, delete "steam" and insert -- stream --, therefor.

In Column 15, Line 3, Claim 16, delete "steam" and insert -- stream --, therefor.

In Column 15, Line 9, Claim 16, delete "steam" and insert -- stream --, therefor.

Signed and Sealed this
Third Day of March, 2020

Andrei Iancu
*Director of the United States Patent and Trademark Office*